United States Patent
Bassis

(10) Patent No.: US 10,514,088 B2
(45) Date of Patent: Dec. 24, 2019

(54) AUTOMATIC OIL EXCHANGE SERVICE FOR ELECTRIC VEHICLE GEARBOXES

(71) Applicant: NIO USA, Inc., San Jose, CA (US)

(72) Inventor: Dimitri Bassis, Menlo Park, CA (US)

(73) Assignee: NIO USA, Inc., San Jose, CA (US)

( * ) Notice: Subject to any disclaimer, the term of this patent is extended or adjusted under 35 U.S.C. 154(b) by 355 days.

(21) Appl. No.: 15/365,422

(22) Filed: Nov. 30, 2016

(65) Prior Publication Data

US 2018/0112766 A1   Apr. 26, 2018

Related U.S. Application Data

(60) Provisional application No. 62/411,322, filed on Oct. 21, 2016.

(51) Int. Cl.
| | |
|---|---|
| *F16H 57/04* | (2010.01) |
| *H02J 7/00* | (2006.01) |
| *B60L 53/00* | (2019.01) |
| *B60L 53/30* | (2019.01) |
| *B60L 53/60* | (2019.01) |

(52) U.S. Cl.
CPC .......... *F16H 57/0408* (2013.01); *B60L 53/00* (2019.02); *B60L 53/30* (2019.02); *B60L 53/60* (2019.02); *F16H 57/0405* (2013.01); *F16H 57/0476* (2013.01); *H02J 7/0027* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC ............ F16H 57/0408; F16H 57/0405; F16H 57/0476; B60L 53/00; B60L 53/60; B60L 53/30; H02J 7/0027
See application file for complete search history.

(56) References Cited

U.S. PATENT DOCUMENTS

| | | | |
|---|---|---|---|
| 4,674,456 A * | 6/1987 | Merritt | |
| 6,170,505 B1 | 1/2001 | Erwin | |
| 6,237,647 B1 | 5/2001 | Pong et al. | |
| 6,896,014 B1 * | 5/2005 | Bedi | |
| 7,686,136 B2 | 3/2010 | Evans | |
| 8,746,410 B1 | 6/2014 | Lekowicz | |
| 10,030,553 B2 * | 7/2018 | Bach | |
| 2002/0148686 A1 | 10/2002 | Yun et al. | |
| 2007/0051757 A1 | 3/2007 | Lim et al. | |

* cited by examiner

*Primary Examiner* — Michael A Riegelman
(74) *Attorney, Agent, or Firm* — Sheridan Ross P.C.

(57) ABSTRACT

A system and method for automatic oil exchange service for electric vehicle gearboxes. The system and method includes a mechanism for monitoring and reporting status of the oil change in the gearbox. This ensures that each oil change is kept track of, that the oil is the correct grade, and that the vehicle ends up with oil that has maximum properties, avoiding contamination and improving the life of the gearbox. The present invention may be integrated directly at the same place as an electric vehicle charging station, supercharger station, or at any battery swap station.

12 Claims, 3 Drawing Sheets

AUTOMATIC OIL EXCHANGE SERVICE FOR ELECTRIC VEHICLE GEARBOXES

CROSS REFERENCE TO RELATED APPLICATION

The present application claims the benefits of and priority, under 35 U.S.C. § 119(e), to U.S. Provisional Application Serial No. 62/411,322, filed on Oct. 21, 2016, entitled "AUTOMATIC OIL EXCHANGE SERVICE FOR EV GEARBOXES," of which the entire disclosure is hereby incorporated by reference, in its entirety, for all that it teaches and for all purposes.

FIELD OF INVENTION

The present invention relates generally to oil system servicing for electric vehicles, and more specifically to an automatic oil exchange service for electric vehicle gearboxes.

BACKGROUND

Gearboxes on electric vehicles (EVs) are generally highly loaded mechanical devices in terms of rotating speed and torque. Durability of components such as gear teeth, bearings, or any sliding surfaces, are thus extremely dependent upon the lubrication system and the oil grade/viscosity selected for the gearbox. Some EV manufacturers, however, do not provide oil servicing of the gearbox. As a result, particles get inside causing contamination and oxidation of the gearbox. This deteriorates the initial properties of the gearbox over utilization time, thus reducing the expected life of the gearbox.

To combat this, other EV manufacturers provide oil servicing at regular short intervals. One disadvantage to current EV oil servicing, however, is that the servicing occurs separate from charging of the vehicles, which increases maintenance times and delays. In addition, it is difficult to monitor and track each oil servicing interval. This leads to less-than-optimal servicing and an overall decreased life expectancy of the gearbox.

Thus, it would be useful to offer an architecture that provides monitored service of oil of the gearbox while simultaneously charging the vehicle, to avoid contamination and ensure durability and increased life expectancy of the gearbox.

SUMMARY

The embodiments described herein provide a method and apparatus for automatic oil servicing of electric vehicle gearboxes. The servicing system may include a common supporting structure that may be a mobile robot, a moving platform, a mechanical articulated arm, or any other supporting structure, to provide automatic servicing. At least one hose for the oil feed and one hose for the oil return may be used. Optional apparatuses may include an inert gas supply/return system, conditioned air supply/return, oil level sensor, or any other monitoring sensor. Quantities may be managed by a volumetric pump.

In one embodiment, the automatic servicing system includes a station, an actuator, and a supporting structure. The station comprises one or more oil reservoirs, a reversible pump, and a monitoring system. The station may be connected to the supporting structure by at least one supply hose, at least one return hose, and an oil level sensor wire. Each hose and wire may be positioned on the supporting structure to match a specific gearbox flange located on the surface of the gearbox.

The station may detect a position of gearbox and flanges in the vehicle via the monitoring system. The station may communicate with the actuator and the supporting structure via the monitoring system to move toward the gearbox with the attached hoses and wires. The supporting structure may connect the attached hoses and wires to the gearbox flanges. An oil level sensor may detect the existing oil level in the gearbox. The station may communicate via the monitoring system with reversible pump to drain oil out of gearbox via the return hose into an oil reservoir in the station. The station may subsequently communicate via the monitoring system with the reversible pump to supply clean, filtered, and new or recycled oil into the gearbox via the supply hose. Drained oil stored in the oil reservoir may be removed from the station and analyzed directly at the facility. A sample may also be kept for monitoring of the gearbox and electric vehicle performances.

In another embodiment, the station and supporting structure may also be connected by an air/inert gas hose. Thus, pressurized conditioned air may be optionally fed into the gearbox to help reduce corrosion of mechanical parts.

The present invention may be integrated directly at the same place as an electric vehicle charging station, supercharger station, or at any battery swap station. These stations may provide the opportunity to exchange gearbox oils since the automated process may be free of action from the car driver and may take no more time than the time provided for the battery change or recharge. For example, in the case of a vehicle with four independent motors, the system may deal with the four gearboxes simultaneously, or may be fast enough to do the job sequentially.

The present invention offers to the customer and the car manufacturer an opportunity to monitor the oil degradation and oil change status in the gearbox and take the subsequent conclusions and actions. This ensures that each oil change is kept track of, that the oil is the correct grade, and that the vehicle ends up with oil that has maximum properties, improving the life of the gearbox. For the manufactures, it may guarantee that the recommended oil will be used in the gearbox, thus reducing the risk of bad publicity through bad servicing.

In some examples oil services may not depend on the user to ensure the required service intervals. The use of correct oil grade/viscosity and a global increased durability of mechanical parts of the gearbox may also be handled without dependency on the user to make a selection. Also, some configurations may better control environmental issues by frequently monitoring the performances of the vehicles.

BRIEF DESCRIPTION OF THE DRAWING(S)

The present invention is illustrated by way of example, and not by way of limitation, in the figures of the accompanying drawings in which.

DETAILED DESCRIPTION OF THE PREFERRED EMBODIMENT(S)

Figure 1A:
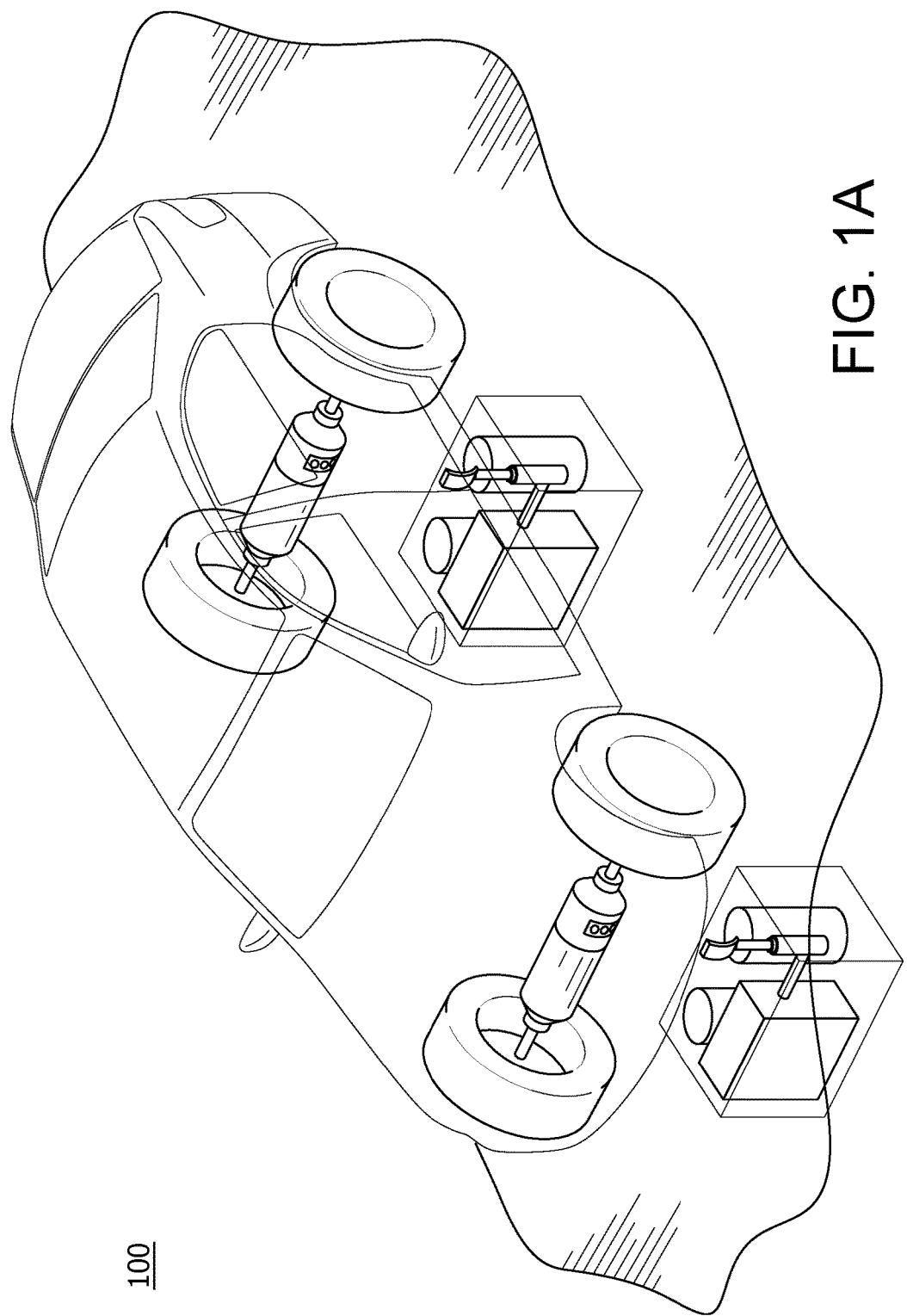
FIG. 1A is a macro-view of an example automatic servicing system as it performs oil servicing on an electric vehicle.
Figure 1B:
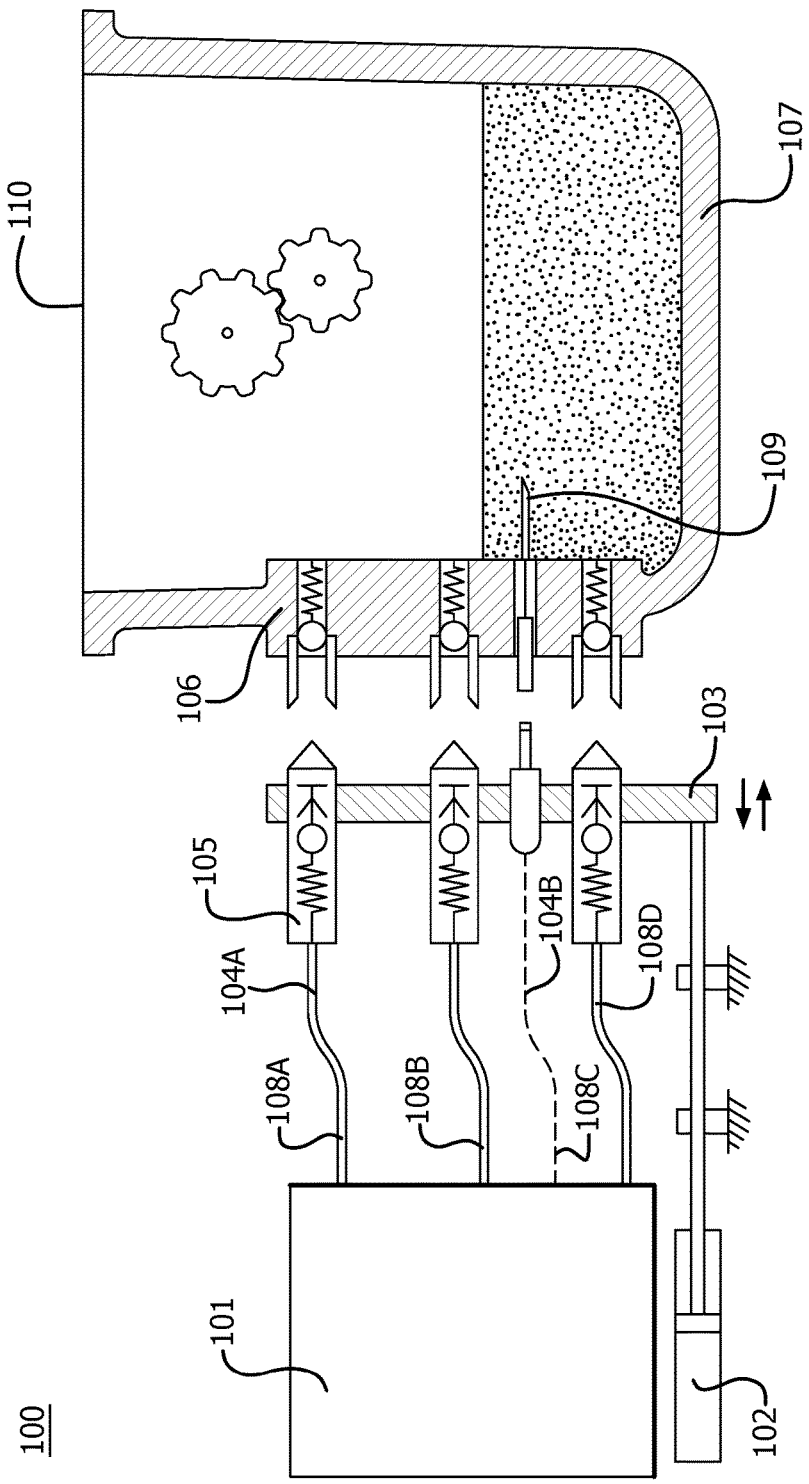
FIG. 1B is an example automatic servicing system as it interacts with a gearbox when performing oil servicing.

FIGS. 1A and 1B depict an example automatic servicing system. FIG. 1A depicts the system on a macro level as it performs oil servicing on an electric vehicle at a servicing facility. FIG. 1B depicts the system with respect to its interaction with a gearbox of an electric vehicle as it performs oil servicing. The automatic servicing system 100 in these embodiments includes a station 101, an actuator 102, and a supporting structure 103. Supporting structure 103 may comprise an upper, middle, and lower portion. Supporting structure 103 may be a mobile robot, a moving platform, a mechanical articulated arm, or any other supporting structure, to provide automatic servicing.

Actuator 102 may be attached to the lower portion of supporting structure 103. Station 101 may be connected to supporting structure 103 by hoses 104a and wires 104b. In this embodiment, station 101 may be connected to supporting structure 103 by at least one supply hose 108b, at least one return hose 108d, and an oil level sensor wire 108c. Station 101 and supporting structure 103 may also be connected by an air/inert gas hose 108a. Supply hose 108b, return hose 108d and air/inert gas hose 108a are attached to supporting structure 103 via non-leak quick disconnects 105.

Each hose and wire may be positioned on supporting structure 103 to match a specific gearbox flange 106 located on the surface of a gearbox housing 107 of a gearbox 110 for automatic oil servicing. In this embodiment, return hose 108d may be attached to the lower portion of supporting structure 103. Supply hose 108b and oil level sensor wire 108c may be attached to the middle portion of supporting structure 103. Air/inert gas line hose 108a may be attached to the upper portion of supporting structure 103.

Supply hose 108b, return hose 108d and air/inert gas line hose 108a are connected to their respect flanges 106 via the non-leak quick disconnect couplings 105. The connection may be actuated mechanically or electro-mechanically for increased safety. Gearbox flanges 106 may include a pressure relief valve or check valve mounted to prevent and avoid leakage.

Figure 1C:
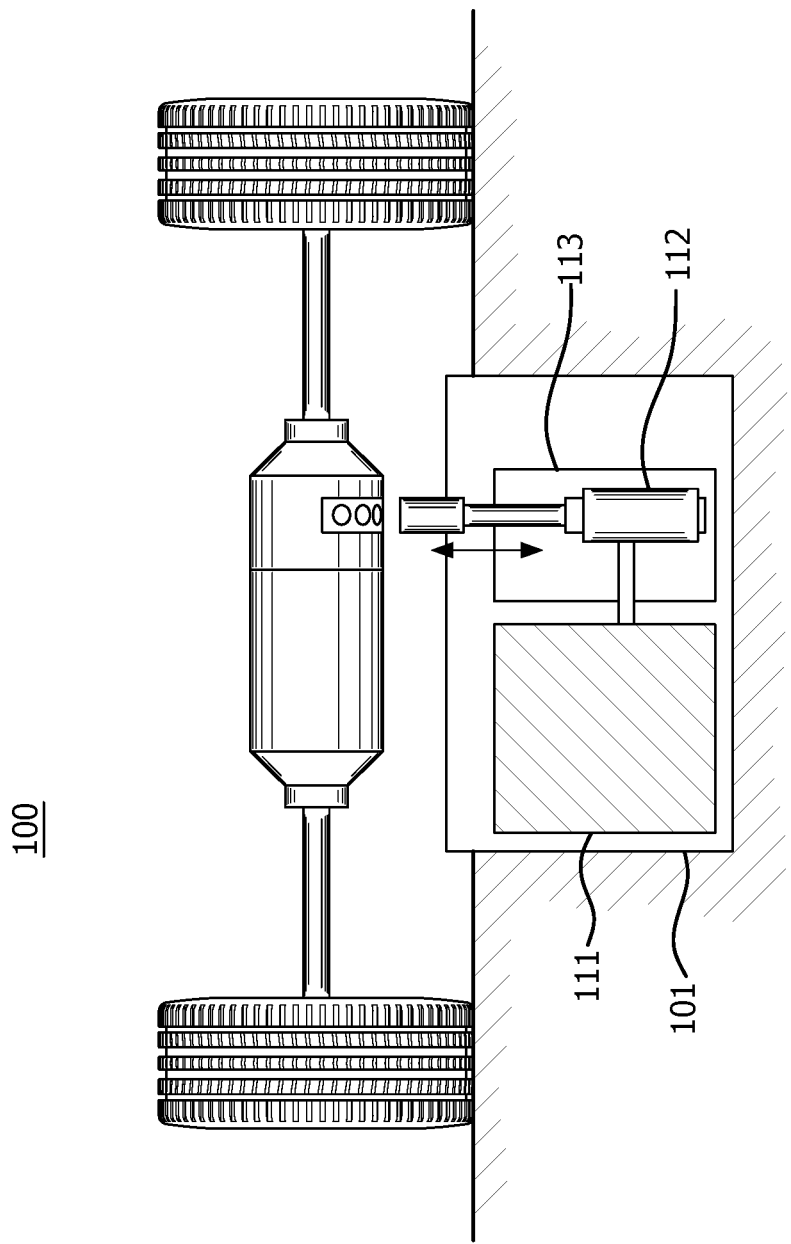
FIG. 1C is a side view of an example station of the automatic servicing system.

FIG. 1C depicts an example station in relation to automatic servicing system 100. Station 101 comprises one or more oil reservoirs 111, a reversible pump 112, and a monitoring system 113. Station 101 may be partially buried in the ground to allow supporting structure 103 to connect with gearbox flanges 106.

In one example, station 101 may detect a position of gearbox housing 107 and flanges 106 in a vehicle via a computer control unit in monitoring system 113. Station 101 may communicate with actuator 102 and supporting structure 103 via monitoring system 113 to move toward gearbox housing 107 with attached supply hose 108b, return hose 108d, oil level sensor wire 108c, and air/inert gas line hose 108a. Supporting structure 103 may connect the attached hoses and wires to flanges 106 via non-leak quick disconnect couplings 105. Oil level sensor 109 may detect the existing oil level in gearbox 110. Oil level sensor wire 108c may send oil level information to monitoring system 113.

Based on this information, station 101 may communicate via monitoring system 113 with reversible pump 112 to drain oil out of gearbox 110 via return hose 108d to oil reservoir 111. Thus, the return hose may be positioned on the lowest portion of supporting structure 103 to connect to the lowest flange 106 on gearbox 110 to ensure thorough draining of oil. Oil level sensor 109 may confirm and send information to monitoring system 113 that gearbox 110 has been drained.

Station 101 may subsequently communicate via monitoring system 113 with reversible pump 112 to supply clean, filtered, and new or recycled oil into gearbox 110 via supply hose 108b. Reversible pump 112 may be fed clean oil from an oil reservoir 111 in station 101 or from any external supply.

Reversible pump 112 may be a volumetric pump. If the pumping is done by a volumetric pump, then the theoretical time of pumping can be set up proportionally to the oil volume carried by gearbox 110. Thus, reversible pump 112 may supply the right amount of oil to the gearbox. Additionally, oil level sensor 109 may detect the adequate amount of oil to pump into gearbox 110, and send information to monitoring system 113 to stop supplying oil.

Pressurized conditioned air may be optionally fed into gearbox 110 via air/inert gas line hose 108a to help reduce corrosion of mechanical parts. The air or inert gas pressure in the gearbox may be adjusted by the corresponding hose.

Drained oil stored in oil reservoir 111 may be removed from station 101 and analyzed directly at the facility. A sample may also be kept for monitoring of the gearbox and electric vehicle performances, where information is stored in monitoring system 113. In addition, stored information may be sent to the manufacturer database to keep track of when and in what frequency the vehicle requires servicing.

What is claimed is:

1. A system for automatic oil in servicing of an electric vehicle gearbox, comprising:
   a station;
   an actuator having a retracted state and an extended state;
   a supporting structure coupled to the actuator; and
   a return hose, a supply hose, and an oil level sensor wire coupled to the station and the supporting structure, wherein the return hose is coupled with a return hose coupling attached to the supporting structure and the supply hose is coupled with a supply hose coupling attached to the supporting structure, wherein the return hose coupling is separated a distance from the supply hose coupling, wherein the return hose coupling and the supply hose coupling are configured to be received by and coupled with corresponding parts of a gearbox in the electric vehicle when the actuator is in the extended state, and wherein the return hose coupling and the supply hose coupling are configured to be detached from and decoupled from the corresponding parts of the gearbox in the electric vehicle when the actuator is in the retracted state;
   wherein, when the actuator is in the extended state, the oil level sensor wire sends gearbox oil level information to the station, the return hose drains oil from the gearbox, and the supply hose supplies clean oil to the gearbox, thereby facilitating the automatic oil servicing.

2. The system according to claim 1, wherein the station includes:
   one or more oil reservoirs that store drained oil and, clean oil;
   a reversible pump that pumps oil out of and into the gearbox via the return hose and the supply hose, respectively; and
   a monitoring system that communicates with the actuator and receives the gearbox oil level information from the oil level sensor.

3. The system according to claim 2, wherein the monitoring system includes a computer control unit.

4. The system according to claim 2, wherein the reversible pump is a volumetric pump.

5. The system according to claim 1, wherein the return hose coupling and the supply hose coupling each comprise non-leak quick disconnect couplings, and wherein the return hose coupling and the supply hose coupling engage with mating non-leak quick disconnect couplings disposed on the gearbox, when the actuator is in the extended state.

6. The system according to claim 5, wherein a monitoring system of the station detects a position of the gearbox and communicates with the actuator moving the actuator from the retracted state to the extended state engaging the non-leak quick disconnect couplings with the mating non-leak quick disconnect couplings disposed on the gearbox.

7. The system according to claim 1, wherein an air/inert gas line hose is coupled to the station and attached to the supporting structure to be further coupled to the gearbox when the actuator is in the extended state.

8. The system according to claim 7, wherein the air/inert gas line supplies pressurized, conditioned air into the gearbox.

9. The system according to claim 1, wherein the corresponding parts of the gearbox in the electric vehicle are separated from one another by the distance separating the return hose coupling from the supply hose coupling.

10. The system according to claim 1, wherein the oil level sensor wire receives the gearbox oil level information from an oil level sensor disposed on the gearbox, and wherein the gearbox oil level information is sent by the oil level sensor wire to a monitoring system in communication with the actuator.

11. The system according to claim 1, wherein the station is disposed separate and apart from the electric vehicle gearbox and under the electric vehicle providing access to engage the return hose coupling and the supply hose coupling with the corresponding parts of the gearbox.

12. A system for automatic oil servicing of electric vehicle gearboxes, comprising:
a plurality of stations matching a number of gearboxes of an electric vehicle, wherein each station of the plurality of stations comprises:
a reversible pump;
a monitoring system comprising a computer control unit;
an actuator including a portion that is movable between a retracted state and an extended state;
a supporting structure coupled to the portion of the actuator; and
a return hose and a supply hose coupled to the station and the supporting structure, wherein the return hose is coupled with a return hose coupling attached to the supporting structure and the supply hose is coupled with a supply hose coupling attached to the supporting structure, wherein the return hose coupling is separated a distance from the supply hose coupling, wherein the return hose coupling and the supply hose coupling are configured to be received by and coupled with corresponding parts of a respective gearbox of the number of gearboxes in the electric vehicle when the actuator is in the extended state, and wherein the return hose coupling and the supply hose coupling are configured to be detached from and decoupled from the corresponding parts of the respective gearbox when the actuator is in the retracted state;
wherein the monitoring system detects a position of the respective gearbox and communicates with the actuator moving the actuator from the retracted state to the extended state engaging the return hose coupling and the supply hose coupling with the corresponding parts of the respective gearbox, communicates with the reversible pump and drains oil from the respective gearbox via the return hose, and communicates with the reversible pump suppling clean oil to the gearbox via the supply hose, thereby facilitating the automatic oil servicing.

* * * * *

UNITED STATES PATENT AND TRADEMARK OFFICE
CERTIFICATE OF CORRECTION

PATENT NO. : 10,514,088 B2
APPLICATION NO. : 15/365422
DATED : December 24, 2019
INVENTOR(S) : Dimitri Bassis Page 1 of 1

It is certified that error appears in the above-identified patent and that said Letters Patent is hereby corrected as shown below:

In the Claims

Claim 1, Column 4, Line 1, after "oil" delete "in".
Claim 2, Column 4, Line 3, delete the "," after "and" therein.

Signed and Sealed this
Third Day of March, 2020

Andrei Iancu
*Director of the United States Patent and Trademark Office*